(12) United States Patent
Nakaoka

(10) Patent No.: US 8,066,915 B2
(45) Date of Patent: Nov. 29, 2011

(54) COMPOSITE CARBONATE AND METHOD FOR PRODUCING THE SAME

(75) Inventor: Yasuhiro Nakaoka, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 13/014,855

(22) Filed: Jan. 27, 2011

(65) Prior Publication Data

US 2011/0114900 A1 May 19, 2011

Related U.S. Application Data

(62) Division of application No. 12/362,918, filed on Jan. 30, 2009, now Pat. No. 7,897,069.

(30) Foreign Application Priority Data

Feb. 1, 2008 (JP) ................................. 2008-022628

(51) Int. Cl.
*H01B 1/08* (2006.01)
*C01B 31/24* (2006.01)
(52) U.S. Cl. .................................. 252/521.2; 423/420.2
(58) Field of Classification Search ............... 252/518.1, 252/521.2, 521.6; 429/223–224; 423/61, 423/420.2
See application file for complete search history.

(56) References Cited

U.S. PATENT DOCUMENTS

| 7,767,189 B2 * | 8/2010 | Liu et al. ..................... 423/593.1 |
| 7,838,148 B2 * | 11/2010 | Nakaoka ....................... 429/223 |
| 7,879,266 B2 * | 2/2011 | Nakaoka ..................... 252/521.2 |
| 2005/0265909 A1 * | 12/2005 | Kajiya et al. ...................... 423/1 |
| 2007/0292763 A1 * | 12/2007 | Park et al. .................. 429/231.1 |
| 2008/0219911 A1 | 9/2008 | Sun et al. |
| 2009/0087746 A1 * | 4/2009 | Kang et al. .................... 429/219 |
| 2009/0226811 A1 | 9/2009 | Nakaoka |
| 2010/0117025 A1 | 5/2010 | Takeuchi et al. |

FOREIGN PATENT DOCUMENTS

| JP | 2001-148249 A | 5/2001 |
| JP | 2006-117517 A | 5/2006 |

\* cited by examiner

*Primary Examiner* — Mark Kopec
(74) *Attorney, Agent, or Firm* — Westerman, Hattori, Daniels & Adrian, LLP

(57) ABSTRACT

The present invention provides a method for producing a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery. The composite carbonate includes nickel atoms, manganese atoms and cobalt atoms, and has an average particle size of 5 μm or more and less than 20 μm, a BET specific surface area of 40 to 80 $m^2/g$ and a tap density of 1.7 g/ml or more.

6 Claims, 1 Drawing Sheet

COMPOSITE CARBONATE AND METHOD FOR PRODUCING THE SAME

CROSS-REFERENCE TO RELATED APPLICATIONS

This application is a DIV of Ser. No. 12/362,918 (filed Jan. 30, 2009, now U.S. Pat. No. 7,897,069), which is based upon and claims benefit of priority from Japanese Patent Application No. 2008-22628 filed on Feb. 1, 2008, the entire contents of which being incorporated herein by reference.

BACKGROUND OF THE INVENTION

1. Field of the Invention

The present invention relates to a composite carbonate useful as a raw material for producing a lithium nickel manganese cobalt composite oxide to be used in a positive electrode active material for use in a lithium secondary battery and a method for producing the composite carbonate.

2. Description of the Related Art

Lithium cobaltate has hitherto been used as a positive electrode active material for a lithium secondary battery. However, lithium nickel manganese cobalt composite oxides low in cobalt content have been developed because cobalt is a rare metal.

In these years, there have been demanded batteries excellent in rapid charge properties to be used in electric automobiles and power tools such as electric tools. Although increase of the specific surface area of the positive electrode material is a technique to cope with rapid charge, lithium nickel manganese cobalt composite oxides having hitherto been developed are all small in specific surface area.

Most of conventional methods for synthesizing lithium nickel manganese cobalt composite oxides use as starting raw materials nickel manganese cobalt composite hydroxides; the raw materials are small in specific surface area, and consequently, lithium nickel manganese cobalt composite oxides obtained therefrom are also small in specific surface area.

On the other hand, methods using as starting raw materials nickel manganese cobalt composite carbonates have also been proposed. Proposed examples of the method for producing a nickel manganese cobalt composite carbonate include the following two methods: the method of Japanese Patent Laid-Open No. 2001-148249 (p. 7, p. 9) (Patent Document 1) in which a solution that contains sulfates of nickel, manganese and cobalt and an aqueous solution that contains ammonium bicarbonate are simultaneously or alternately added dropwise to a water-containing solution to conduct the reaction while the pH of the solution is being controlled to fall within a range from 6.5 to 8.5; and the method of Japanese Patent Laid-Open No. 2006-117517 (p. 7) (Patent Document 2) in which a solution that contains sulfates of nickel, manganese and cobalt and an aqueous solution that contains sodium carbonate are simultaneously added to a water-containing solution to conduct the reaction.

However, the composite carbonates obtained by the production methods disclosed in above-described Patent Documents 1 and 2 are 40 $m^2/g$ or more in the BET specific surface area as the case may be but are as small as less than 1.7 g/ml in tap density, and accordingly suffers from a problem that the lithium composite oxide produced by using the composite carbonate gives a low filling density of the positive electrode active material in an electrode fabricated with the composite carbonate. Thus, there has been demanded development of a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery.

Accordingly, an object of the present invention is to provide a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery, and to provide a method for industrially advantageously producing the composite carbonate.

SUMMARY OF THE INVENTION

In view of the above-described circumstances, the present inventors diligently conducted a great deal of study, and consequently, perfected the present invention by discovering that: when a composite carbonate is obtained by conducting a reaction by adding a solution (solution A) that contains a nickel salt, a manganese salt and a cobalt salt and a solution (solution B) that contains a metal carbonate or a metal hydrogen carbonate to a solution (solution C) that contains the same anions as the anions of the nickel salt, the manganese salt and the cobalt salt in the solution A and the same anion as the anion of the metal carbonate or the metal hydrogen carbonate in the solution B, the composite carbonate is higher both in specific surface area and in tap density than conventional composite carbonates, and additionally has a specific average particle size; the lithium nickel manganese cobalt composite oxide obtained by using the thus obtained composite carbonate as the raw material for producing the composite oxide is high both in specific surface area and in tap density; and a lithium secondary battery that uses the composite oxide as the positive electrode active material exhibits excellent battery performance.

Specifically, an aspect (1) of the present invention is the provision of a composite carbonate, wherein the composite carbonate includes nickel atoms, manganese atoms and cobalt atoms, and has an average particle size of 5 μm or more and less than 20 μm, a BET specific surface area of 40 to 80 $m^2/g$ and a tap density of 1.7 g/ml or more.

Additionally, an aspect (2) of the present invention is the provision of a method for producing a composite carbonate, wherein the composite carbonate is obtained by conducting a reaction by adding a solution (solution A) that contains a nickel salt, a manganese salt and a cobalt salt and a solution (solution B) that contains a metal carbonate or a metal hydrogen carbonate to a solution (solution C) that contains the same anions as the anions of the nickel salt, the manganese salt and the cobalt salt in the solution A and the same anion as the anion of the metal carbonate or the metal hydrogen carbonate in the solution B.

According to the present invention, there can be provided a nickel atom-, manganese atom- and cobalt atom-containing composite carbonate that is high in specific surface area and large in tap density, and useful as a raw material for producing a lithium nickel manganese cobalt composite oxide to be used in a positive electrode active material for use in a lithium secondary battery, and there can be provided a method for industrially advantageously producing the composite carbonate. Additionally, a lithium nickel manganese cobalt composite oxide high both in specific surface area and in tap density can be obtained by using the composite carbonate of the present invention as a raw material for producing the composite oxide. Yet additionally, a lithium secondary battery that uses the composite oxide as a positive electrode active material exhibits excellent battery performance, in particular, excellent load property.

DETAILED DESCRIPTION OF THE PREFERRED EMBODIMENTS

Figure 1:
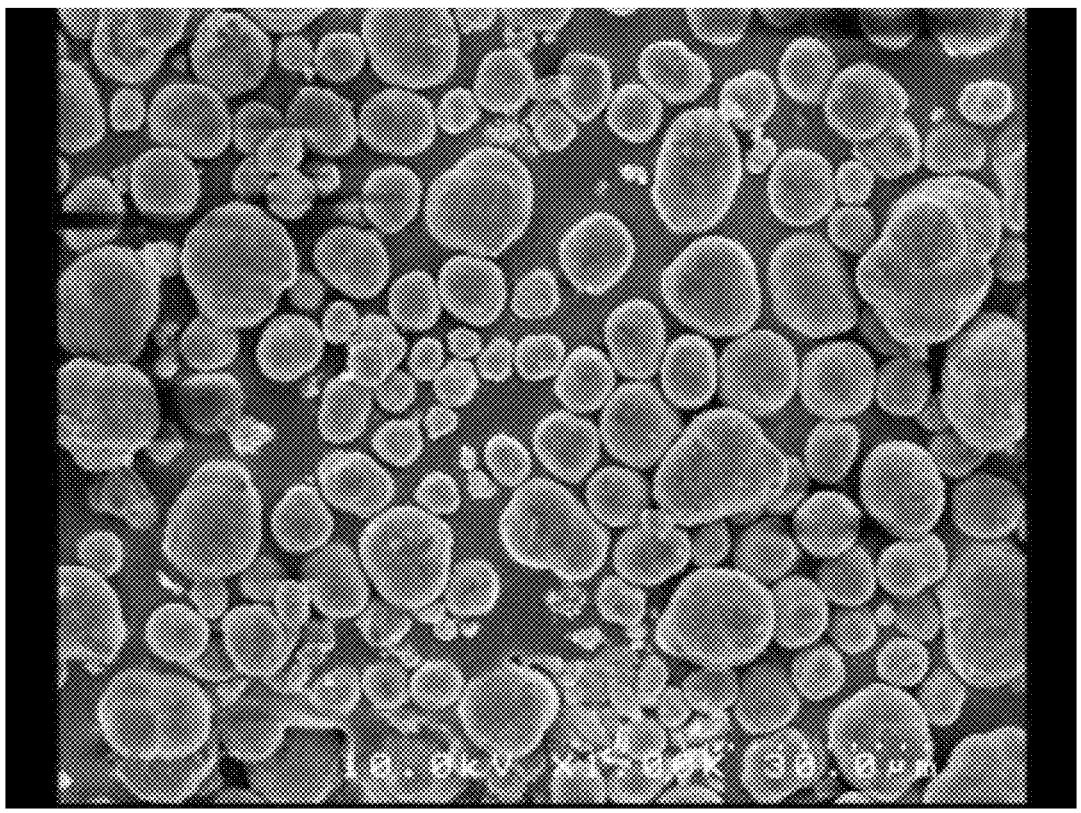
FIG. 1 is an electron micrograph of a composite carbonate obtained in Example 1.

Hereinafter, the present invention is described on the basis of the preferred embodiments thereof.

The composite carbonate of the present invention is a composite carbonate that contains nickel atoms, manganese atoms and cobalt atoms, and has an average particle size of 5 μm or more and less than 20 μm, a BET specific surface area of 40 to 80 $m^2/g$ and a tap density of 1.7 g/ml or more.

The composite carbonate of the present invention is a composite carbonate that contains nickel atoms, manganese atoms and cobalt atoms. In the composite carbonate of the present invention, the ratio of the content of the nickel atoms to the content of the manganese atoms is, in terms of the molar ratio of the nickel atom content to the manganese atom content (Ni:Mn), preferably 1:0.5 to 2.0, particularly preferably 1:0.9 to 1.1 and further preferably 1:0.95 to 1.05. Also in the composite carbonate of the present invention, the ratio of the content of the nickel atoms to the content of the cobalt atoms is, in terms of the molar ratio of the nickel atom content to the cobalt atom content (Ni:Co), preferably 1:0.5 to 2.0, particularly preferably 1:0.9 to 1.1 and further preferably 1:0.95 to 1.05. When the ratio of the content of the manganese atoms to the content of the nickel atoms is less than the above-described range, the content of manganese that is an element low in price becomes low to tend to be uneconomical, and on the other hand, when exceeds the above-described range, the tap density tends to be low. Also when ratio of the content of the cobalt atoms to the content of the nickel atoms is less than the above-described range, the tap density tends to be low, and on the other hand, when exceeds the above-described range, the content of high price cobalt becomes large to tend to be uneconomical.

The average particle size of the composite carbonate of the present invention is 1 μm or more and less than 20 μm and preferably 5 to 15 μm in terms of the average particle size obtained by a laser particle size distribution measurement method.

One of the features of the composite carbonate of the present invention is the high specific surface area thereof. Specifically, the BET specific surface area of the composite carbonate of the present invention is 40 to 80 $m^2/g$ and preferably 50 to 80 $m^2/g$. The BET specific surface area of the composite carbonate of the present invention falling within the above-described range yields a lithium nickel manganese cobalt composite oxide high in specific surface area, and consequently enables to improve the battery performance, in particular, the load property of a lithium secondary battery.

The tap density of the composite carbonate of the present invention is 1.7 g/ml or more and preferably 1.7 to 2.2 g/ml. The tap density of the composite carbonate of the present invention falling within the above-described range yields a lithium nickel manganese cobalt composite oxide high in tap density, hence makes excellent the filling property of the composite oxide, and consequently enables to improve the battery performance, in particular, the volume energy density of a lithium secondary battery, and additionally enables the mass production of a lithium nickel manganese cobalt composite oxide.

It is to be noted that the tap density as referred to in the present invention is defined as a value derived by a tap method on the basis of the apparent density or apparent specific volume method described in JIS-K-5101 as follows: 5 g of a sample is placed in a 5-ml graduated cylinder, tapped 500 times and allowed to stand still, then the volume of the sample is read off and the tap density is derived from the following calculation formula:

$$\text{Tap density (g/ml)}=F/V$$

wherein F represents the mass (g) of the treated sample in the graduated cylinder and V represents the volume (ml) of the sample after tapping.

Next, the method for producing a composite carbonate of the present invention is described. The method for producing a composite carbonate of the present invention is a method for producing a composite carbonate wherein the composite carbonate is obtained by conducting a reaction by adding a solution (solution A) that contains a nickel salt, a manganese salt and a cobalt salt and a solution (solution B) that contains a metal carbonate or a metal hydrogen carbonate to a solution (solution C) that contains the same anions as the anions of the nickel salt, the manganese salt and the cobalt salt in the solution A and the same anion as the anion of the metal carbonate or the metal hydrogen carbonate in the solution B.

In other words, the method for producing a composite carbonate of the present invention is a method for producing a composite carbonate wherein the nickel atom-, manganese atom- and cobalt atom-containing composite carbonate is obtained by conducting the reaction by adding the solution A and the solution B to the solution C.

The solution A involved in the method for producing a composite carbonate of the present invention is a solution that contains a nickel salt involved in the solution A, a manganese salt involved in the solution A and a cobalt salt involved in the solution A.

The nickel salt involved in the solution A is not particularly limited as long as the nickel salt is water-soluble to yield a nickel ion-containing aqueous solution; examples of the nickel salt include the sulfate salt, the chloride salt, the nitrate salt and the acetate salt of nickel. Additionally, the manganese salt involved in the solution A is not particularly limited as long as the manganese salt is water-soluble to yield a manganese ion-containing aqueous solution; examples of the manganese salt include the sulfate salt, the chloride salt, the nitrate salt and the acetate salt of manganese. Additionally, the cobalt salt involved in the solution A is not particularly limited as long as the cobalt salt is water-soluble to yield a cobalt ion-containing aqueous solution; examples of the cobalt salt include the sulfate salt, the chloride salt, the nitrate salt and the acetate salt of cobalt. Among these salts, the sulfate salts and the chloride salts are preferable because of being economical. In the solution A, the nickel salt involved in the solution A may include two or more types of nickel salts different in anion from each other, the manganese salt involved in the solution A may include two or more types of manganese salts different in anion from each other, and the cobalt salt involved in the solution A may include two or more types of cobalt salts different in anion from each other. Additionally, in the solution A, the anion of the nickel salt involved in the solution A, the anion of the manganese salt involved in the solution A and the anion of the cobalt salt involved in the solution A may be the same or different from each other.

The solution A is obtained by dissolving in water, for example, the nickel salt involved in the solution A, the manganese salt involved in the solution A and the cobalt salt involved in the solution A. In other words, the solution A is an aqueous solution of the nickel salt involved in the solution A, the manganese salt involved in the solution A and the cobalt salt involved in the solution A. The solution A may contain the impurities contained in the nickel salt involved in the solution A, the manganese salt involved in the solution A and the cobalt salt involved in the solution A, and may contain other metal salts as long as the other metal salts do not adversely affect the advantageous effects of the present invention.

In the solution A, the content of nickel ions in terms of nickel atom is preferably 0.1 to 2.0 mol/L and particularly preferably 0.5 to 2.0 mol/L, the content of manganese ions in terms of manganese atom is preferably 0.1 to 2.0 mol/L and particularly preferably 0.5 to 2.0 mol/L, and the content of cobalt ions in terms of cobalt atom is preferably 0.1 to 2.0 mol/L and particularly preferably 0.5 to 2.0 mol/L. The contents of the nickel ions, the manganese ions and the cobalt ions in the solution A respectively falling within the above-described ranges enable to reduce the amount of the waste solution left after the reaction preferably from the viewpoint of being industrially advantageous.

Additionally, in the solution A, the ratio of the content of the nickel ions to the content of the manganese ions is, in terms of the molar ratio of the nickel atom content to the manganese atom content (Ni:Mn), preferably 1:0.5 to 2.0, particularly preferably 1:0.9 to 1.1 and further preferably 1:0.95 to 1.05. Also in the solution A, the ratio of the content of the nickel ions to the content of the cobalt ions is, in terms of the molar ratio of the nickel atom content to the cobalt atom content (Ni:Co), preferably 1:0.5 to 2.0, particularly preferably 1:0.9 to 1.1 and further preferably 1:0.95 to 1.05. The molar ratio in the solution A between the nickel atom content, manganese atom content and cobalt atom content falling within the above-described range further enhances the effects to increase the specific surface area and the tap density of the composite carbonate.

On the other hand, in the solution A, the total content of the anion of the nickel salt involved in the solution A, the anion of the manganese salt involved in the solution A and the anion of the cobalt salt involved in the solution A is preferably 0.3 to 12 mol/L and particularly preferably 1.5 to 12 mol/L although the total content is varied depending on the types of the metal salts.

The solution B involved in the method for producing a composite carbonate of the present invention is a solution that contains any one or both of the metal carbonate involved in the solution B and the metal hydrogen carbonate involved in the solution B.

The metal carbonate involved in the solution B is not particularly limited as long as the metal carbonate is water-soluble to yield a carbonate ion-containing aqueous solution; examples of the metal carbonate include: alkali metal carbonates such as sodium carbonate and potassium carbonate; and ammonium carbonate. The metal hydrogen carbonate involved in the solution B is not particularly limited as long as the metal hydrogen carbonate is water-soluble to yield a hydrogen carbonate ion-containing aqueous solution; examples of the metal hydrogen carbonate include: alkali metal hydrogen carbonates such as sodium hydrogen carbonate and potassium hydrogen carbonate; and ammonium hydrogen carbonate. Preferable among these is sodium hydrogen carbonate because sodium hydrogen carbonate does not contain ammonia, renders the pH of the reaction solution nearly neutral and is low in price. In the solution B, the metal carbonate involved in the solution B may include two or more types of metal carbonates different in cation from each other, and the metal hydrogen carbonate involved in the solution B may include two or more types of metal hydrogen carbonates different in cation from each other. Additionally, in the solution B, when the solution B contains the metal carbonate involved in the solution B and the metal hydrogen carbonate involved in the solution B, the cation of the metal carbonate involved in the solution B and the cation of the metal hydrogen carbonate involved in the solution B may be the same or different from each other.

The solution B is obtained by dissolving in water, for example, any one or both of the metal carbonate involved in the solution B and the metal hydrogen carbonate involved in the solution B. In other words, the solution B is an aqueous solution of any one or both of the metal carbonate involved in the solution B and the metal hydrogen carbonate involved in the solution B. The solution B may contain the impurities contained in the metal carbonate involved in the solution B or the metal hydrogen carbonate involved in the solution B, and may contain other metal salts as long as the other metal salts do not adversely affect the advantageous effects of the present invention.

In the solution B, the content of carbonate ions or hydrogen carbonate ions (the total content of carbonate ions and hydrogen carbonate ions when the solution B contains both of the metal carbonate involved in the solution B and the metal hydrogen carbonate involved in the solution B), in terms of $CO_3$, is preferably 0.1 to 2.0 mol/L and particularly preferably 0.5 to 2.0 mol/L. The content of the carbonate ions or the hydrogen carbonate ions in the solution B falling within the above-described range enable to reduce the amount of the waste solution left after the reaction preferably from the viewpoint of being industrially advantageous.

On the other hand, in the solution B, the content of the cation of the metal carbonate involved in the solution B or the cation of the metal hydrogen carbonate involved in the solution B (the total content of the cation of the metal carbonate involved in the solution B and the cation of the metal hydrogen carbonate involved in the solution B when the solution B contains both of the metal carbonate involved in the solution B and the metal hydrogen carbonate involved in the solution B), in terms of the metal atom of the cation, is preferably 0.1 to 2.0 mol/L and particularly preferably 0.5 to 2.0 mol/L although the cation content is varied depending on the type(s) of the metal salt(s).

The solution C involved in the method for producing a composite carbonate of the present invention is a solution that contains "the same anions as the anions of the nickel salt, the manganese salt and the cobalt salt contained in the solution A involved in the method for producing a composite carbonate of the present invention" and "the same anion as the anion of the metal carbonate or the metal hydrogen carbonate contained in the solution B involved in the method for producing a composite carbonate of the present invention."

The solution C is obtained by dissolving in water, for example, "a metal salt that contains the following same anion when the anion of the nickel salt, the anion of the manganese salt and the anion of the cobalt salt contained in the solution A are the same and that does not react with the anion of the metal carbonate or the metal hydrogen carbonate contained in the solution B" and "a metal salt that contains the anion of the metal carbonate or the metal hydrogen carbonate contained in the solution B." Alternatively, the solution C is obtained by dissolving in water, for example, "a plurality of metal salts that contain respectively the following individual anions when the anion of the nickel salt, the anion of the manganese salt and the anion of the cobalt salt contained in the solution A are different from each other and that do not react with the anion of the metal carbonate or the metal hydrogen carbonate contained in the solution B" and "a metal salt that contains the anion of the metal carbonate or the metal hydrogen carbonate contained in the solution B."

(i) For example, when the solution A contains a nickel salt, a manganese salt and a cobalt salt all containing the same anion and the solution B contains any one of a metal carbonate and a metal hydrogen carbonate, specifically, when the solution A contains nickel chloride, manganese chloride and cobalt chloride, and the solution B contains sodium hydrogen carbonate, then the solution C contains chloride ion and hydrogen carbonate ion. In this case, the solution C is obtained by dissolving in water, for example, a metal salt such as sodium chloride that has the same anion as the anion of nickel chloride, manganese chloride and cobalt chloride contained in the solution A and that does not react with sodium hydrogen carbonate contained in the solution B and a metal salt such as sodium hydrogen carbonate that has the same anion as the anion of sodium hydrogen carbonate contained in the solution B.

(ii) Additionally, when the solution A contains a nickel salt, a manganese salt and a cobalt salt different in anion from each other and the solution B contains any one of a metal carbonate and a metal hydrogen carbonate, specifically, when the solution A contains nickel chloride, manganese sulfate and cobalt nitrate and the solution B contains sodium carbonate, then the solution C contains chloride ion, sulfate ion, nitrate ion and carbonate ion. In this case, the solution C is obtained by dissolving in water, for example, a plurality of metal salts such as sodium chloride, sodium sulfate and sodium nitrate that have the respective anions of nickel chloride, manganese sulfate and cobalt nitrate contained in the solution A and that do not react with the sodium carbonate contained in the solution B and a metal salt such as sodium carbonate that has the same anion as the anion of sodium carbonate contained in the solution B.

(iii) Still additionally, when the solution A contains a nickel salt, a manganese salt and a cobalt salt all having the same anion and the solution B contains both of a metal carbonate and a metal hydrogen carbonate, specifically, when the solution A contains nickel chloride, manganese chloride and cobalt chloride and the solution B contains sodium carbonate and sodium hydrogen carbonate, then the solution C contains chloride ion, carbonate ion and hydrogen carbonate ion. In this case, the solution C is obtained by dissolving in water, for example, a metal salt such as potassium chloride that has the same anion as the anions of nickel chloride, manganese chloride and cobalt chloride contained in the solution A and that does not react with the sodium carbonate and sodium hydrogen carbonate contained in the solution B and metal salts such as potassium carbonate and sodium hydrogen carbonate that have respectively the same anions as the anions of sodium carbonate and sodium hydrogen carbonate contained in the solution B.

(iv) Yet additionally, when the solution A contains a nickel salt, a manganese salt and a cobalt salt different in anion from each other and the solution B contains both of a metal carbonate and a metal hydrogen carbonate, specifically, when the solution A contains nickel chloride, manganese sulfate and cobalt nitrate and the solution B contains sodium carbonate and potassium hydrogen carbonate, then the solution C contains chloride ion, sulfate ion, nitrate ion, carbonate ion and hydrogen carbonate ion. In this case, the solution C is obtained by dissolving in water, for example, a plurality of metal salts such as sodium chloride, potassium sulfate and potassium nitrate that have the respective anions of nickel chloride, manganese sulfate and cobalt nitrate contained in the solution A and that do not react with the sodium carbonate and potassium hydrogen carbonate contained in the solution B and metal salts such as potassium carbonate and sodium hydrogen carbonate that have respectively the same anions as the anions of sodium carbonate and potassium hydrogen carbonate contained in the solution B.

The inclusion, in the solution C, of the same anion(s) as the anion(s) of the nickel salt, manganese salt and cobalt salt contained in the solution A and the same anion as the anion of the metal carbonate or the metal hydrogen carbonate contained in the solution B enables to reduce the change of the anion component in the solution under reaction, hence enables to simultaneously increase the specific surface area and the tap density of the composite carbonate, and additionally enables to stably produce the composite carbonate of the present invention.

It is to be noted that the solution C may contain the impurities contained in the metal salts used in the preparation of the solution C, and may contain other metal salts as long as the other metal salts do not adversely affect the advantageous effects of the present invention.

In the solution C, the total content of "the same anion(s) as the anion(s) in the nickel salt, manganese salt and cobalt salt contained in the solution A" and "the same anion as the anion of the metal carbonate or the metal hydrogen carbonate contained in the solution B" is, in terms of the anion component, preferably 0.1 to 2.0 mol/L and particularly preferably 0.5 to 1.5 mol/L, and the ratio (Y/X) of "the content (Y) of the same anion(s) as the anion(s) of the nickel salt, manganese salt and cobalt salt contained in the solution A" to "the content (X) of the same anion as the anion of the metal carbonate or the metal hydrogen carbonate contained in the solution B" is preferably 0.1 to 2.0 and particularly preferably 0.5 to 1.5. The total content of "the same anion(s) as the anion(s) in the nickel salt, manganese salt and cobalt salt contained in the solution A" and "the same anion as the anion of the metal carbonate or the metal hydrogen carbonate contained in the solution B" falling in the above-described range and the ratio (Y/X) of "the content (Y) of the same anion(s) as the anion(s) of the nickel salt, manganese salt and cobalt salt contained in the solution A" to "the content (X) of the same anion as the anion of the metal carbonate or the metal hydrogen carbonate contained in the solution B" falling within the above-described range enable the anion concentration of the reaction solution to always fall within a certain range and hence enable to yield a composite carbonate high both in specific surface area and in tap density with a satisfactory yield. It is to be noted that the above-described contents of the anions in the solution C are all given in number of moles in terms of anions.

The condition that the solution C is a solution that contains the same cation as the cation of the metal carbonate or the metal hydrogen carbonate contained in the solution B is preferable because such a condition makes invariable the cation component in the solution under reaction and yields a composite carbonate high both in tap density and in specific surface area. In this case, the solution C can be prepared by selecting in the preparation of the solution C a metal salt that is composed of the same anion as the anion of the nickel salt, manganese salt and cobalt salt contained in the solution A and the same cation as the cation of the metal carbonate or the metal hydrogen carbonate contained in the solution B.

When the solution C is a solution that contains the same cation as the cation of the metal carbonate or the metal hydrogen carbonate contained in the solution B, the content of the same cation in the solution C as the cation of the metal carbonate or the metal hydrogen carbonate contained in the solution B is, in terms of the metal atom of the cation, preferably 0.1 to 2.0 mol/L and particularly preferably 0.5 to 1.5 mol/L. The content of the same cation in the solution C as the cation of the metal carbonate or the metal hydrogen carbonate contained in the solution B falling within the above-described range facilitates the preparation of a composite carbonate in which the ratio between the contents of the nickel atoms, manganese atoms and cobalt atoms is, in terms of the molar ratio between the nickel atoms, manganese atoms and cobalt atoms, preferably 1:0.9 to 1.1:0.9 to 1.1 and particularly preferably 1:0.95 to 1.05:0.95 to 1.05.

The amount of the solution A added to the solution C and the amount of the solution B added to the solution C are such that the ratio ($CO_3/M$) of the total number of moles ($CO_3$) in terms of $CO_3$ of the carbonate ion and the hydrogen carbonate ion in the reaction solution to the total number of moles (M) of the nickel ions, manganese ions and cobalt ions added from the solution A to the solution C is preferably 2 to 7 and particularly preferably 3 to 6. The amount of the solution A added to the solution C and the amount of the solution B added to the solution C falling within the above-described ranges always ensures the presence of a sufficient amount of ($CO_3$) in the reaction solution in relation to the nickel ions, manganese ions and cobalt ions added from the solution A to the solution C and hence enables to yield a composite carbonate with a high yield. It is to be noted that the total number of moles in terms of $CO_3$ of the carbonate ion and the hydrogen carbonate ion in the reaction solution means the total number of moles in terms of $CO_3$ of the carbonate ion and the hydrogen carbonate ion originally contained in the solution C and the carbonate ion and the hydrogen carbonate ion added from the solution B to the solution C.

In the method for producing a composite carbonate of the present invention, the solution A and the solution B may be simultaneously or alternately added to the solution C; the solution A and the solution B are usually added to the solution C while the solution C is being maintained at 10 to 90° C. and preferably at 20 to 80° C. The solution A and the solution B are added preferably over a period of 0.5 hour or more and particularly preferably over a period of 1 hour or more; additionally, it is preferable to add the solution A and the solution B at a constant rate in such a way that the addition rate is controlled to make constant the ratio between the total number of moles (M) of the nickel ions, manganese ions and cobalt ions added from the solution A to the solution C and the total number of moles in terms of $CO_3$ of the carbonate ion and the hydrogen carbonate ion in the reaction solution because a composite carbonate stable in quality can be obtained in this way. It is preferable to add the solution A and the solution B under stirring. The stirring rate is only required to be such that the slurry that contains the composite carbonate produced over a period from the start of the addition to the end of the reaction is always in a condition to exhibit fluidity, without being particularly limited otherwise.

After completion of the addition of the solution A and the solution B to the solution C, solid-liquid separation is conducted in the usual manner to yield a solid product. The thus obtained solid product is collected and where necessary, washed with water, dried, pulverized and classified to yield the composite carbonate of the present invention.

The composite carbonate thus obtained by applying the method for producing a composite carbonate of the present invention includes nickel atoms, manganese atoms and cobalt atoms, and has an average particle size of 5 µm or more and less than 20 µm, preferably 5 to 15 µm, a BET specific surface area of 40 to 80 m$^2$/g, preferably 50 to 80 m$^2$/g, and a tap density of 1.7 g/ml or more, preferably 1.7 to 2.2 g/ml. Additionally, the molar ratio between the contents of the nickel atoms, the manganese atoms and the cobalt atoms in the composite carbonate is preferably 1:0.5 to 2.0:0.5 to 2.0, preferably 1:0.9 to 1.1:0.9 to 1.1 and particularly preferably 1:0.95 to 1.05:0.95 to 1.05.

The composite carbonate of the present invention is particularly useful as a raw material for producing a lithium nickel manganese cobalt composite oxide to be used as a positive electrode active material of a lithium secondary battery. Particularly preferable is a lithium nickel manganese cobalt composite oxide represented by the following general formula (1):

$$Li_xNi_{1-y-z}Mn_yCo_zO_2 \qquad (1)$$

wherein x satisfies $0.9 \leq x \leq 1.3$, y satisfies $0 < y < 1.0$, preferably $0.45 \leq y \leq 0.55$, and z satisfies $0 < z < 1.0$, preferably $0.45 \leq z \leq 0.55$.

The lithium nickel manganese cobalt composite oxide represented by the above-described general formula (1) is produced by mixing the composite carbonate of the present invention with a lithium compound and by baking the thus obtained homogeneous mixture. Specifically, examples of the lithium compound include lithium carbonate and lithium hydroxide. The addition amount of the lithium compound is such that the ratio (Li/M) of the number of moles of the lithium atoms in the lithium compound to the total number of moles (M) of the nickel atoms, manganese atoms and cobalt atoms included in the composite carbonate is 0.8 to 1.3 and preferably 0.9 to 1.1. The baking conditions are such that the baking temperature is 500 to 1100° C., preferably 650 to 850° C. and the baking time is 2 hours or more, preferably 3 to 12 hours. The baking atmosphere is not particularly limited; the baking may be conducted in the atmosphere or in an oxygen atmosphere. It is to be noted that when raw materials to produce water are baked, the baking is preferably conducted in the atmosphere or in an oxygen atmosphere as a multiple-stage baking; preferably, the baking is conducted slowly within a temperature range from about 200 to 400° C. ensuring the removal of the water contained in the raw materials, preferably over a period of 1 to 10 hours, and thereafter, the baked material is rapidly heated to 650 to 850° C. to be baked further for 1 to 30 hours.

Additionally, the baking may be repeated unlimited times where necessary. Alternatively, for the purpose of ensuring uniform powder properties, a once baked material may be pulverized to be baked again.

After baking, by appropriately cooling, and by pulverizing and classifying where necessary, there can be obtained a lithium nickel manganese cobalt composite oxide that has a BET specific surface area as high as 5 m$^2$/g or more and a tap density as high as 1.7 g/ml or more. Such a lithium nickel manganese cobalt composite oxide is suitably used as a positive electrode active material of a lithium secondary battery.

EXAMPLES

Hereinafter, the present invention is described in detail with reference to Examples. However, the present invention is not limited to these Examples.

Example 1

<Preparation of Solution A>

In purified water, 12.3 g (0.052 mol) of nickel chloride hexahydrate, 10.3 g (0.052 mol) of manganese chloride tetrahydrate and 12.3 g (0.052 mol) of cobalt chloride hexahydrate were dissolved, and then the solution thus obtained was further diluted with purified water to 58 ml to prepare the solution A.

<Preparation of Solution B>

In purified water, 68 g (0.81 mol) of sodium hydrogen carbonate was dissolved, and the solution thus obtained was further diluted with purified water to 850 ml to prepare the solution B.

<Preparation of Solution C>

In purified water, 0.42 g (0.0072 mol) of sodium chloride and 0.89 g (0.011 mol) of sodium hydrogen carbonate were dissolved, and the solution thus obtained was further diluted with purified water to 20 ml to prepare the solution C.

The compositions of these solutions were as follows.

Solution A: Ni: 0.90 mol/L, Mn: 0.90 mol/L, Co: 0.90 mol/L, Cl: 5.38 mol/L

Solution B: $CO_3$: 0.95 mol/L, Na: 0.95 mol/L

Solution C: $CO_3$: 0.53 mol/L, Cl: 0.36 mol/L, Na: 0.89 mol/L

In a reaction vessel, the total amount of the solution C was placed, the solution temperature was maintained at 80° C., and the total amount of the solution A and the total amount of the solution B were simultaneously added dropwise at a constant rate to the solution C under stirring at 1200 rpm over a period of 8 hours.

After the completion of the dropwise addition, solid-liquid separation was conducted in the usual manner, and the collected product was dried at 50° C. for 12 hours and lightly pulverized to yield 18.3 g of a powder product (yield: 99%). The thus obtained powder product was subjected to an XRD measurement and an ICP measurement to reveal that the powder product was a composite carbonate that contained nickel, manganese and cobalt in a molar ratio of 1.00:0.99:0.98.

Example 2

The same solutions A, B and C as in Example 1 were prepared. Then, the total amount of the solution C was placed in a reaction vessel, the solution temperature was maintained at 80° C., and the total amount of the solution A and the total amount of the solution B were simultaneously added dropwise at a constant rate to the solution C under stirring at 2400 rpm over a period of 3.5 hours.

After the completion of the dropwise addition, solid-liquid separation was conducted in the usual manner, and the collected product was dried at 50° C. for 12 hours and lightly pulverized to yield 18.0 g of a powder product (yield: 98%). The thus obtained powder product was subjected to an XRD measurement and an ICP measurement to reveal that the powder product was a composite carbonate that contained nickel, manganese and cobalt in a molar ratio of 1.00:1.02:1.00.

Comparative Example 1

A solution prepared as follows was used as a solution D: in purified water, 0.89 g (0.011 mol) of sodium hydrogen carbonate was dissolved and the solution thus obtained was further diluted to 20 ml to prepare the concerned solution. Otherwise, the same solutions A and B as in Example 1 were prepared.

The compositions of these solutions were as follows.

Solution A: Ni: 0.90 mol/L, Mn: 0.90 mol/L, Co: 0.90 mol/L, Cl: 5.38 mol/L

Solution B: $CO_3$: 0.95 mol/L, Na: 0.95 mol/L

Solution D: $CO_3$: 0.53 mol/L, Na: 0.53 mol/L

In a reaction vessel, the total amount of the solution D was placed, the solution temperature was maintained at 80° C., and the total amount of the solution A and the total amount of the solution B were simultaneously added dropwise at a constant rate to the solution D under stirring at 1200 rpm over a period of 8 hours.

After the completion of the dropwise addition, solid-liquid separation was conducted in the usual manner, and the collected product was dried at 50° C. for 12 hours and lightly pulverized to yield 17.0 g of a powder product (yield: 93%). The thus obtained powder product was subjected to an XRD measurement and an ICP measurement to reveal that the powder product was a composite carbonate that contained nickel, manganese and cobalt in a molar ratio of 1.00:1.00:0.96.

Comparative Example 2

The solutions were prepared in the same manner as in Example 1 except that 20 ml of purified water was adopted as the solution D.

The compositions of these solutions were as follows.

Solution A: Ni: 0.90 mol/L, Mn: 0.90 mol/L, Co: 0.90 mol/L, Cl: 5.38 mol/L

Solution B: $CO_3$: 0.95 mol/L, Na: 0.95 mol/L

Solution D: Purified water

In a reaction vessel, the total amount of the solution D was placed, the solution temperature was maintained at 80° C., and the total amount of the solution A and the total amount of the solution B were simultaneously added dropwise at a constant rate to the solution D under stirring at 1200 rpm over a period of 8 hours.

After the completion of the dropwise addition, solid-liquid separation was conducted in the usual manner, and the collected product was dried at 50° C. for 12 hours and lightly pulverized to yield 17.7 g of a powder product (yield: 96%). The thus obtained powder product was subjected to an XRD measurement and an ICP measurement to reveal that the powder product was a composite carbonate that contained nickel, manganese and cobalt in a molar ratio of 1.00:1.01:0.98.

Comparative Example 3

In purified water, 60.0 g of nickel sulfate, 117.0 g of manganese sulfate and 64.5 g of cobalt sulfate were dissolved in such a way that the molar ratio Ni:Mn:Co was 0.20:0.60:0.20, and the volume of the solution was set at 500 mL (solution A). Separately, in purified water, 107.5 g of ammonium bicarbonate was dissolved, and the solution thus obtained was diluted with an aqueous solution prepared by dissolving 83.5 mL of concentrated aqueous ammonia in purified water to prepare a 500 mL of solution (solution B).

Next, in an about 3-L stirring reaction vessel, 75 mL of spare water (solution D) was placed, and heated so as to reach 43° C. While continuously heating, the solution A and the solution B were alternately added in the reaction vessel respectively with metering pumps at rates of a few milliliters/min over a period of about 10 hours. After completion of the addition of these reaction solutions, the reaction mixture was retained for about 1 hour under stirring to promote further crystal growth. Thereafter, the deposited precipitate was filtered off, washed with water, and then dried for 24 hours to yield 85.7 g of a powder product (yield: 64%). The thus obtained powder product was subjected to an XRD measurement and an ICP measurement to reveal that the powder product was a composite carbonate that contained nickel, manganese and cobalt in a molar ratio of 1.00:17.14:4.27.

Comparative Example 4

In 300 mL of purified water (solution D) set at a temperature of 50° C., 400 mL of a mixed aqueous solution (solution A) of nickel sulfate, manganese sulfate and cobalt sulfate (0.4 mol respectively in terms of nickel ion, manganese ion and cobalt ion) and 500 mL of an aqueous solution (solution B) of sodium carbonate (1.6 mol in terms of carbonate ion) were added parallel under stirring over a period of 6 hours while the temperature was being maintained, and the reaction mixture was neutralized. Then, the deposited precipitate was filtered off and washed to yield 163 g of a powder product (yield: 115%). The thus obtained powder product was subjected to an XRD measurement and an ICP measurement to reveal that the powder product was a composite carbonate that contained nickel, manganese and cobalt in a molar ratio of 1.00:0.97:0.97.

<Evaluation of Physical Properties>

For each of the composite carbonates obtained in Examples 1 to 3 and Comparative Examples 1 to 3, the average particle size, the BET specific surface area, the tap density and the sphericity were measured, and the results thus obtained are shown in Table 1.

(1) Average Particle Size

The average particle size was obtained by a laser particle size distribution measurement method.

(2) Tap Density

The tap density was obtained on the basis of the apparent density or apparent specific volume method described in JIS-K-5101 as follows: 5 g of a sample was placed in a 5-ml graduated cylinder, the graduated cylinder was set in an automated tap density analyzer (Dual Autotap, manufactured by Yuasa Ionics Co., Ltd.), the sample was tapped 500 times and then the volume of the sample was measured to derive the apparent density as the tap density.

(3) Electron Microscope Observation

An electron micrograph of the composite carbonate obtained in Example 1 is shown in FIG. 1.

TABLE 1

| | Composition ratio (mol) | | | Average particle size | BET specific surface area | Tap density |
|---|---|---|---|---|---|---|
| | Ni | Mn | Co | (μm) | (m²/g) | (g/ml) |
| Example 1 | 1.00 | 0.99 | 0.98 | 10.0 | 58.1 | 1.85 |
| Example 2 | 1.00 | 1.02 | 1.00 | 6.2 | 50.4 | 1.72 |
| Comparative Example 1 | 1.00 | 1.00 | 0.96 | 4.6 | 96.6 | 1.41 |
| Comparative Example 2 | 1.00 | 1.01 | 0.98 | 4.8 | 58.4 | 1.45 |
| Comparative Example 3 | 1.00 | 17.14 | 4.27 | 7.7 | 40.0 | 1.65 |
| Comparative Example 4 | 1.00 | 0.97 | 0.97 | 4.5 | 187.9 | 1.02 |

Examples 3 and 4

The composite carbonates obtained in Examples 1 and 2 and lithium carbonate (average particle size: 4.5 μm) were weighed out in such a way that the ratio (Li/M) of the number of moles of the lithium atoms in lithium carbonate to the total number of moles (M) of the nickel atoms, manganese atoms and cobalt atoms in each of the composite carbonates was 1.03, and each of the composite carbonates was mixed with lithium carbonate sufficiently with a mixer; thus homogeneous mixtures were obtained.

Next, each of the thus obtained mixtures was baked at 800° C. for 10 hours in the atmosphere, then cooled, thereafter pulverized and classified to yield a lithium nickel manganese cobalt composite oxide. The physical properties of each of the thus obtained lithium nickel manganese cobalt composite oxides were measured in the same manner as described above, and the results thus obtained are shown in Table 2.

Comparative Example 5

A commercially offered composite hydroxide that contained nickel atoms, manganese atoms and cobalt atoms in a molar ratio of 1.00:1.01:0.98, and has an average particle size of 10.9 μm, a BET specific surface area of 6.6 m²/g and a tap density of 2.09 g/ml and lithium carbonate (average particle size: 4.5 μm) were weighed out in such a way that the ratio (Li/M) of the number of moles of the lithium atoms in lithium carbonate to the total number of moles (M) of the nickel atoms, manganese atoms and cobalt atoms in the composite hydroxide was 1.03, and the composite hydroxide was mixed with lithium carbonate sufficiently with a mixer; thus homogeneous mixture was obtained.

Next, the thus obtained mixture was baked at 800° C. for 10 hours in the atmosphere, then cooled, thereafter pulverized and classified to yield a lithium nickel manganese cobalt composite oxide. The physical properties of the thus obtained lithium nickel manganese cobalt composite oxide were measured in the same manner as described above, and the results thus obtained are shown in Table 2.

TABLE 2

| | Type of Ni—Mn—Co raw material used | Average particle size (μm) | BET specific surface area (m²/g) | Tap density (g/ml) |
|---|---|---|---|---|
| Example 3 | Example 1 | 9.1 | 9.2 | 1.75 |
| Example 4 | Example 2 | 5.8 | 7.6 | 1.71 |
| Comparative Example 5 | Commercial composite hydroxide | 11.0 | 0.4 | 2.08 |

<Evaluation of Battery Properties>

(1) Fabrication of a Lithium Secondary Battery

A positive electrode mixture was prepared by mixing together 85% by mass of each of the lithium nickel manganese cobalt composite oxides obtained in Examples 3 and 4 and Comparative Example 5, 10% by mass of a graphite powder and 5% by mass of polyvinylidene fluoride, and the obtained mixture was dispersed in N-methyl-2-pyrrolidinone to prepare a kneaded paste. An aluminum foil was coated with the obtained kneaded paste, then dried, and punched out by press working to form a disc of 15 mm in diameter, and thus a positive electrode plate was obtained.

Next, a lithium secondary battery was fabricated by using the positive electrode plate, and by using the individual members such as a separator, a negative electrode, a positive electrode, current collector plates, mounting brackets, external terminals and an electrolyte. Among these members, the negative electrode used was a lithium metal foil, and the electrolyte used was an electrolyte prepared by dissolving 1 mol of $LiPF_6$ in 1 liter of a one-to-one kneaded liquid of ethylene carbonate and methyl ethyl carbonate.

(2) Evaluation of Battery Performance

Each of the fabricated lithium secondary batteries was operated at room temperature to evaluate the initial discharge capacity, the initial charge-discharge efficiency and the load property, and the results thus obtained are shown in Table 3.

<Evaluation Methods of Initial Discharge Capacity and Initial Charge-discharge Efficiency>

Charge-discharge was conducted as follows: under the condition of the constant-current and constant-voltage (CCCV) in relation to the positive electrode, charge was conducted at 1.0 C over a period of 5 hours up to 4.3 V, and thereafter, discharge was conducted at a discharge rate of 0.2 C down to 2.7 V. The initial discharge capacity and the initial charge-discharge efficiency were measured. The results thus obtained are shown in Table 3. It is to be noted that the initial charge-discharge efficiency was obtained on the basis of the following calculation formula:

Initial charge-discharge efficiency (%)=[(initial discharge capacity)/(initial charge capacity)]×100

<Evaluation of Load Property>

Each of the fabricated lithium secondary batteries was operated at room temperature to evaluate the load property. First, charge-discharge was conducted as follows: under the condition of the constant-current and constant-voltage (CCCV) in relation to the positive electrode, charge was conducted at 0.5 C over a period of 5 hours up to 4.3 V, and thereafter, discharge was conducted at a discharge rate of 0.2 C down to 2.7 V. A set of these operations was defined as one cycle. Every cycle, the discharge capacity was measured. This cycle was repeated three times, and the arithmetic average of the three discharge capacity values was derived to be defined as the discharge capacity at 0.2 C.

The above-described operation was also conducted at 2 C to obtain a discharge capacity. From these two discharge capacity values, the discharge capacity ratio of the discharge capacity at 2 C to the discharge capacity at 0.2 C was calculated. The results thus obtained are also shown in Table 3 under the heading of load property. The larger this discharge capacity ratio is, the better the load property.

TABLE 3

|  | Initial discharge capacity (mAh/g) | Initial charge-discharge efficiency (%) | Load property |
| --- | --- | --- | --- |
| Example 3 | 166 | 94 | 0.88 |
| Example 4 | 169 | 93 | 0.90 |
| Comparative Example 5 | 153 | 70 | 0.79 |

I claim:

1. A method for producing a composite carbonate, wherein the composite carbonate is obtained by conducting a reaction by adding
 a solution (solution A) that contains a nickel salt, a manganese salt and a cobalt salt and
 a solution (solution B) that contains a metal carbonate or a metal hydrogen carbonate to
 a solution (solution C) that contains the same anions as the anions of the nickel salt, the manganese salt and the cobalt salt in the solution A and the same anion as the anion of the metal carbonate or the metal hydrogen carbonate in the solution B.

2. The method for producing a composite carbonate according to claim 1, wherein the nickel salt, the manganese salt and the cobalt salt contained in the solution A are sulfates or chlorides.

3. The method for producing a composite carbonate according to claim 1, wherein the metal carbonate or the metal hydrogen carbonate contained in the solution B is sodium hydrogen carbonate.

4. The method for producing a composite carbonate according to claim 1, wherein in the solution C, the total content of the same anions as the anions of the nickel salt, the manganese salt and the cobalt salt contained in the solution A and the same anion as the anion of the metal carbonate or the metal hydrogen carbonate contained in the solution B is 0.1 to 2.0 mol/L, and the molar ratio of the content of the same anions as the anions of the nickel salt, the manganese salt and the cobalt salt contained in the solution A to the content of the same anion as the anion of the metal carbonate or the metal hydrogen carbonate contained in the solution B is 0.1 to 2.0.

5. The method for producing a composite carbonate according to claim 1, wherein the solution C is a solution that contains the same cation as the cation of the metal carbonate or the metal hydrogen carbonate contained in the solution B.

6. The method for producing a composite carbonate according to claim 5, wherein in the solution C, the content of the same cation as the cation of the metal carbonate or the metal hydrogen carbonate contained in the solution B is 0.1 to 2.0 mol/L.

* * * * *